UNITED STATES PATENT OFFICE.

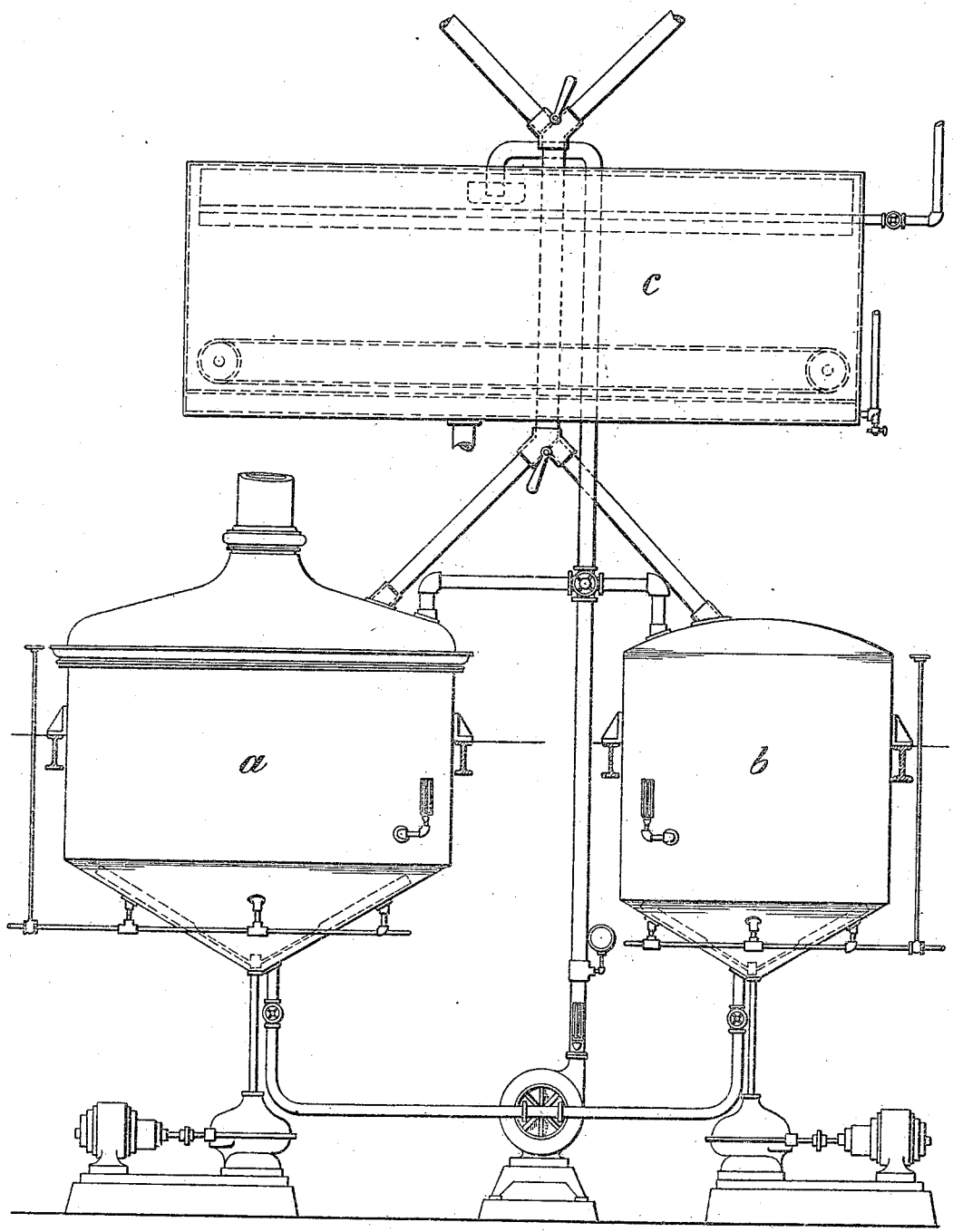

JOSEPH SCHNEIBLE, OF WEEHAWKEN, NEW JERSEY.

ART OF BREWING.

961,539.  Specification of Letters Patent. Patented June 14, 1910.

Application filed December 6, 1909. Serial No. 531,499.

*To all whom it may concern:*

Be it known that I, JOSEPH SCHNEIBLE, a citizen of the United States, residing in Weehawken, in the State of New Jersey, have invented certain new and useful Improvements in the Art of Brewing, of which the following is a specification, reference being had to the accompanying drawing, forming a part hereof.

In the manufacture of beer and other similar beverages, whether fermented or unfermented, alcoholic or non-alcoholic, as the same is ordinarily conducted, the hops, which supply the aromatic properties of the beverage, are boiled with the wort after the same has been drawn off from the mash. The boiling is usually carried on from one to two or more hours. Boiling for the shorter period prevents the redissolving of undesirable albumenoids which is brought about by boiling for the longer period, but boiling for the shorter period does not fully extract all of the desirable properties of the hops. By the ordinary method, therefore, neither boiling for the shorter period nor boiling for the longer period produces wholly satisfactory results. Furthermore, the boiling of the hops with the wort, that is, in a malt beverage, after the desirable properties of the malt have been extracted, permits reaction of the tannin contained in the hops, principally on the desirable, soluble albumen of the malt, which impairs the foam keeping qualities and palate fullness of the finished product. Again, the boiling of the hops with the wort carries into solution in the wort certain of the undesirable hop resins which give a harsh taste to the finished product.

It is the object of this invention to avoid these objectionable results of the ordinary method of brewing and to simplify and improve the method, and in accordance with the invention the hops, either in whole or in part, are boiled with the cooked mash, which may be either the raw cereal mash, if such be used, or part of the malt mash.

The improved method, which will be more fully explained hereinafter, with reference to the manufacture of beer, as the same is otherwise carried on, may be conducted with any suitable apparatus, and in the accompanying drawing there is shown, in elevation and outline, one form of apparatus which is adapted for the purpose.

The apparatus shown in the drawing comprises a mash tank $a$ which may be used for peptonizing the malt mash at a suitable temperature and may also be used afterward as a kettle for the sterilizing and boiling of the wort; a tank $b$, which may be used for the cooking of the raw cereal or of a small part of the malt mash, in case no cereal mash is used, together with the hops; a strainer tank $c$, to which the malt mash and the cereal mash, either separately or together, are delivered and wherein the conversion of the starch by the diastase is carried on and from which the wort may be drawn off either to the tank $a$, which, as stated, may serve as a kettle, or to another suitable kettle, in which the wort is sterilized and boiled; and a pump and suitable connections for the transfer of the liquid from one tank to another, as may be necessary, together with suitable stirring apparatus and steam connections for heating.

The apparatus shown is in general such an apparatus as is shown and described in Letters Patent of the United States No. 775,780, dated November 22, 1904, and the operation, except as hereinafter explained, is carried on substantially as described in said patent.

In the practice of the improved method, with such an apparatus as that shown in the patent referred to, the hops, or a portion thereof, are cooked with the raw cereal in the tank $b$ and this cooking is carried on usually for two hours or more, according to the material used. It will, of course, be understood that if the cooking is carried on under pressure greater than atmospheric pressure the time may be correspondingly reduced. This cooking of the hops with the raw cereal for the relatively protracted period permits the desirable matters in the hops to be thoroughly extracted, effecting a complete emulsification and solution of the desirable resins and other desirable constituents of the hops. At the same time, through the cooking of the hops with the raw cereal, two very important results are secured, namely the complete neutralization of the hop tannin by reaction on the insoluble albumenoids contained in the cereal mash, thus preventing reaction of the hop tannin on the desirable, soluble albumen of the malt mash, and the putting into readily extractable condition all the desirable constituents of the hops. When the cooking of the hops with the raw cereal has been carried on as long as may be desirable, the contents of the tank *b* and the contents of the tank *a* are transferred to the strainer tank *c* either separately or together, as may be desired, and after the conversion of the starch by the diastase in the tank *c*, the wort is drawn off to the kettle where it is sterilized and boiled as may be required. It is found in practice that the "break", that is, the coagulation of the undesirable albumenoids carried into the wort from the combined mash, takes place in a much shorter time than in the ordinary method, so that the additional time given to the cooking of the hops with the cereal mash is fully compensated for or more than compensated for.

It will be understood, of course, that the improved method may be carried on in any convenient apparatus and that the mixing of the mashes may be effected in any convenient manner. Furthermore, the cooking of the hops may be carried on either in the raw cereal mash or in a part of the malt mash and it will be obvious that it is not essential that all of the hops be cooked with either mash, it being possible to boil a portion of the hops with the wort if it is desired to secure in the wort some of the more volatile constituents of the hops, although it is preferable to cook all of the hops in the manner above described.

I claim as my invention:

1. The improvement in the art of brewing which consists in cooking hops in a part of the mash and then mixing such part of the mash with the remainder of the mash, before conversion of the starch.

2. The improvement in the art of brewing which consists in cooking hops in the cereal mash, before conversion of the starch.

3. The improvement in the art of brewing which consists in cooking hops in the cereal mash and then mixing the same with the malt mash, before conversion of the starch.

This specification signed and witnessed this 19th day of November, A. D., 1909.

JOSEPH SCHNEIBLE.

Signed in the presence of—
 ELLA J. KRUGER,
 AMBROSE L. O'SHEA.